United States Patent [19]

Tabata et al.

[11] Patent Number: 4,710,317

[45] Date of Patent: Dec. 1, 1987

[54] FLAME RETARDANT POLYOLEFIN RESIN COMPOSITION

[75] Inventors: Nobuchika Tabata; Shohji Fukumitsu, both of Ichiharashi, Japan

[73] Assignee: Chisso Corporation, Osaka, Japan

[21] Appl. No.: 864,983

[22] Filed: May 20, 1986

[30] Foreign Application Priority Data

May 28, 1985 [JP] Japan .................. 60-114776

[51] Int. Cl.$^4$ ................ C09K 21/00; C08K 5/49; C08K 5/51

[52] U.S. Cl. .................... 252/609; 252/601; 524/110; 524/120; 524/128; 524/146; 524/147; 524/409; 524/411; 524/464; 524/469; 524/470; 524/583; 524/585; 521/907

[58] Field of Search ............. 252/609, 601; 521/907; 524/89, 119-120, 140-141, 146-147, 411, 486, 583, 585, 469, 470, 371, 375, 409, 412, 464, 110, 128

[56] References Cited

U.S. PATENT DOCUMENTS

| | | | |
|---|---|---|---|
| 3,000,850 | 9/1951 | Ainsworth | 524/120 |
| 3,039,993 | 6/1962 | Friedman | 524/120 |
| 3,660,533 | 5/1972 | Drake et al. | 252/609 |
| 3,705,209 | 12/1972 | Matlack et al. | 252/609 |
| 3,893,970 | 7/1975 | Versnel | 524/120 |
| 3,959,413 | 5/1976 | Schwarzenbach et al. | 524/120 |
| 4,410,648 | 10/1983 | Kato et al. | 524/101 |
| 4,430,467 | 2/1984 | Lesniewski et al. | 524/89 |

*Primary Examiner*—Stephen J. Lechert, Jr.
*Assistant Examiner*—Howard J. Locker
*Attorney, Agent, or Firm*—Fred Philpitt

[57] ABSTRACT

A flame retardant polyolefin resin composition which, when molded, affords a molded product having highly flame retardant properties, no dripping properties, a smooth surface and an excellent appearance and superior resistances to heavy metal deterioration, heat deterioration and weather is provided, which composition consists of (A) 5-60% by weight of a halogen-containing flame retardant, (B) 100-10% by weight of antimony trioxide based on the weight of the halogen-containing flame retardant, (C) 0.5-15% by weight of a crosslinking agent, (D) 0.05-5% by weight of a specified thiophosphite, and (E) the balance % by weight of a polyolefin resin, the total of the quantities of (A), (B), (C), (D) and (E) being 100% by weight. If necessary, a processing aid may be further added to the above flame retardant polyolefin resin composition.

8 Claims, No Drawings

FLAME RETARDANT POLYOLEFIN RESIN COMPOSITION

BACKGROUND OF THE INVENTION

1. Field of the Invention

This invention relates to a polyolefin resin composition having highly flame retardant properties and superior heavy metal deterioration resistance, heat deterioration resistance and weather resistance and when molded, affording a molded product having an excellent appearance. More particularly it relates to a flame retardant polyolefin resin composition having a halogen-containing flame retardant, antimony trioxide, a crosslinking agent, a specified thiophosphite and if necessary, a specified processing aid, blended with a polyolefin resin, and having superior heavy metal deterioration resistance, heat deterioration resistance, weather resistance, highly flame retardant properties, and drip-preventing properties and superior processability, and when molded, affording a molded product having a superior appearance.

2. Description of the Prior Art

Since polyolefin resins are superior in processability, chemical resistance, weather resistance, electric characteristics, they have been very often used in various fields including fields of parts of domestic electric products.

On the other hand, however, the resins have drawbacks that they are very readily combustible, and when burnt, once liquefy due to thermal decomposition, and then there occur dropping of ignited droplets or non-ignited droplets and falling down of combustion pieces (hereinafter such dropping materials and falling-down materials will be referred to as "drip" and the properties of causing the drip will be referred to as "dripping properties"). The presence or absence of this drip is one of important factors at the time of evaluating flame retardant properties of the resins, and if the drip is present, their flame retardant properties are low ranked even when the self-extinguishing properties are superior. As described above, improvement in the dripping properties is one of serious problems in the art of making the resins flame retardant. Thus, for making polyolefin resins flame retardant, various proposals have so far been made.

As general processes for making the resins flame retardant, addition of an organic halogen-containing flame retardant, antimony trioxide and a salt of a higher fatty acid with a specified metal to polyolefin resins (Japanese patent publication No. Sho 51-25061/1976), addition of a nitrogen-containing compound or a hydrous inorganic compound as a flame retardant to polyolefin resins and the like processes have been carried out.

However, products obtained by merely adding an organic halogen-containing flame retardant to polyolefin resins are superior in the self-extinguishing properties at the time of combustion, but they have a drawback of causing drip at the time of combustion.

Further, products obtained by adding a hydrous inorganic compound such as magenesium hydroxide as a flame retardant to polyolefin resins are superior in the dripping properties and also have self-extinguishing properties to a certain extent, but in order to impart a highly flame retardant effectiveness, it is necessary to add a large quantity of the inorganic compound to polyolefin resins; thus polyolefin resin compositions obtained by adding a large quantity of the inorganic compound have a drawback that their molding processability deteriorates due to reduction in the fluidity of the melt and the mechanical strength of molded products obtained by molding the compositions lowers; hence the practical quantity thereof added is limited in the aspect of physical properties and it is difficult to make the resins highly flame retardant.

In order to overcome these drawbacks, a process of using a bromine-containing flame retardant and a boron-fluoride salt together with polypropylene (Japanese patent application laid-open No. Sho 54-163937/1979), a process of blending a silicon-modified ethylenea-propylene rubber and a flame retardant with a polyethylene resin, followed by crosslinking the blend with an organic peroxide (Japanese patent application laid-open No. Sho 55-110139/1980), a process of adding a silane coupling agent, an ethylene-propylene rubber, chlorinated polyethylene and a flame retardant to a polyethylene resin, followed by molding the mixture and exposing the resulting folded product to water to effect crosslinking (Japanese patent application laid-open No. Sho 55-45716/1980), and other processes have been disclosed.

Further, a flame retardant rubber composition obtained by blending an organic flame retardant, a polyfunctional compound, a cyclic compound having a specified structure, a mineral powder and an organic peroxide with an ethylene-propylene copolymer rubber has been disclosed (Japanese patent application laid-open No. Sho 56-00845/1981) has been disclosed.

The present inventors have made extensive research in order to obtain a polyolefin resin composition improves dripping properties, has highly flame retardant properties and when molded, affords a molded product having an excellent appearance, and as a result, have found that a composition obtained by blending to polyolefin resin, definite quantities of a halogen-containing flame retardant, antimony trioxide, a crosslinking agent and a specified thiophosphite or a composition further having a processing aid blended therein affords, when molded, a molded product having highly flame retardant properties, no dripping properties, a smooth surface and an excellent appearance, and superior heavy metal deterioration resistance, heat deterioration resistance and weather resistance, and have completed the present invention based on this finding.

SUMMARY OF THE INVENTION

As apparent from the foregoing, the object of the present invention is to provide a flame retardant polyolefin resin composition which, when molded, affords a molded product having highly flame retardant properties, no dripping properties, a good processability, a smooth surface and an excellent appearance and superior resistances to heavy metal deterioration, heat deterioration and weather.

The present invention in a first aspect resides in a flame retardant polyolefin resin composition consisting of (A) 5 to 60% by weight of a halogen-containing flame retardant, (B) 100 to 10% by weight of antimony trioxide based on the weight of said halogen-containing flame retardant, (C) 0.5 to 15% by weight of a crosslinking agent, (D) 0.05 to 5% by weight of a thiophosphite selected from those expressed by the following formulas [I], [II], [III] and [IV]:

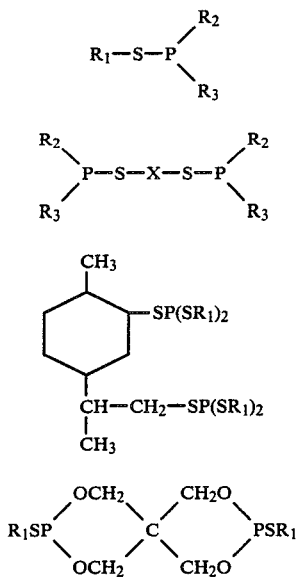

wherein $R_1$ represents an alkyl group, a cycloalkyl group or an aryl group each of 6 to 20 carbon atoms; $R_2$ represents $-SR_2'$ or $-R_2'$; $R_3$ represents $-SR_3'$ or $-R_3'$; $-R_2'$ and $-R_3'$ each represent the same or different alkyl groups, cycloalkyl groups or aryl groups each of 6 to 20 carbon atoms; X represents $-(CH_2)_n-$, $-(CH_2)_n-O-(CH_2)_m-$ or

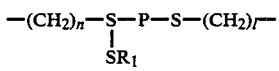

wherein m, n and l each represent an integer of the same or different numbers within a range of 2 to 6, and (E) the balance % by weight of a polyolefin resin the total of the quantities of (A), (B), (C), (D) and (E) being 100% by weight.

The present invention in a second aspect resides in a flame retardant polyolefin resin composition having 0.02 to 1 part by weight of 2-t-butyl-6-(3-t-butyl-2-hydroxy- 5-methylbenzyl)-4-methylphenyl acrylate blended with 100 parts by weight of a resin composition consisting of (A) 5 to 60% by weight of a halogen-containing flame retardant, (B) 100 to 10% by weight of antimony trioxide based on the weight of said halogen-containing flame retardant, (C) 0.5 to 15% by weight of a crosslinking agent, (D) 0.05 to 5% by weight of a thiophosphite selected from those expressed by the following formulas [I], [II], [III] and [IV]:

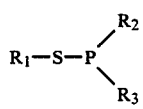

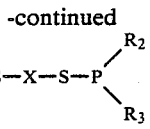

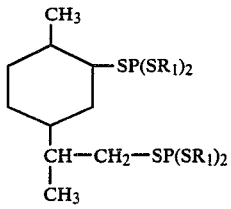

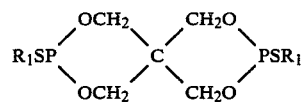

wherein $R_1$ represents an alkyl group, a cycloalkyl group or an aryl group each of 6 to 20 carbon atoms; $R_2$ represents $-SR_2'$ or $-R_2'$; $R_3$ represents $-SR_3'$ or $-R_3'$; $-R_2'$ and $-R_3'$ each represent the same or different alkyl groups, cycloalkyl groups or aryl groups each of 6 to 20 carbon atoms; X represents $-(CH_2)_n-$, $-(CH_2)_n-O-(CH_2)_m-$ or

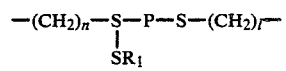

wherein m, n and l each represent an integer of the same or different numbers within a range of 2 to 6, and (E) the balance % by weight of a polyolefin resin, the total of the quantities of (A), (B), (C), (D) and (E) being 100% by weight.

DETAILED DESCRIPTION OF PREFERRED EMBODIMENTS

The halogen-containing flame retardant used in the present invention refers to organic halogenated compounds having a melting point of 270° C. or higher.

Examples of bromine-containing flame retardants are decabromodiphenyl oxide, hexabromobenzene, ethylenebistetrabromophthalimide, etc. Examples of chlorine-containing flame retardants are perchloropentacyclodecane, etc. The blending proportion of the halogen-containing flame retardant is 5 to 60% by weight, preferably 10 to 30% by weight. If the blending proportion is less than 5% by weight, the resulting flame retardant properties are insufficient, and it does not matter if the proportion exceeds 60% by weight, but there is no improvement in the flame retardant effectiveness corresponding to the excess proportion and also the cost increases as much.

The quantity of antimony trioxide blended in the present invention is in the range of 100 to 10% by weight, preferably 70 to 20% by weight based on the weight of the halogen-containing flame retardant used. If the quantity exceeds 100% by weight, the whiteness is so intense that when the composition is intended to have a desired color, this color is difficultly developed. Further, if the quantity is less than 10% by weight, the synergistic effect of antimony trioxide with the halogen-containing flame retardant cannot be expected.

As the crosslinking agent used in the present invention, polyfunctional monomers, oxime nitroso compounds, maleimide compounds, etc. are mentioned. Concrete examples are triallylcyanurate, triallylisocyanurate, (di)ethylene glycol di(meth)acrylate, trimethylolpropane triacrylate, trimethylolpropane trimethacrylate, trimethylol ethylene triacrylate, pentaerythritol triacrylate, pantaerythritol tetraacrylate, divinylbenzene, diallyl phthalate, divinylpyridine, quinone dioxime, benzoquinone dioxime, p-nitrosophenol, N,N'-m-phenylenebismaleimide, etc. Among these, polyfunctional (meth)acrylic acid esters such as trimethylolpropane tri(meth)acrylate, pentaerythritol triacrylate, etc. are preferred.

Further, the blending proportion of the crosslinking agent is in the range of 0.5 to 15% by weight, preferably 1 to 7% by weight. If the proportion is less than 0.5% by weight, there is almost no drip-preventing effect at the time of combustion, while it does not matter if the proportion exceeds 15% by weight, but there is no more improvement in the drip-preventing effect, that is, such excess is meaningless.

Examples of the above thiophosphites expressed by the formulas [I], [II], [III] and [IV] are trilauryltrithiophosphite, tridecyltrithiophosphite, tribenzyltrithiophosphite, tricyclohexyltrithiophosphite, tri(2-ethylhexyl)trithiophosphite, trinaphthyltrithiophosphite, diphenyldecyltrithiophosphite, diphenyllauryltrithiophosphite, tetralauryl-4-oxaheptylene-1,7-tetrathiophosphite, tetrakis(mercaptolauryl)-1,6-dimercaptohexylenediphosphite, pentakis(mercaptolauryl)bis(1,6-hexylene-dimercapto)trithiophosphite, tetrakis(mercaptolauryl)-2,9-dimercapto-para-methylenediphosphite, bis(mercaptolauryl)-1,6-dimercaptohexylene-bis(benzenephosphite), tetrakis(mercaptolauryl)-2,9-dimercapto-para-methylenediphosphite, dioctyldithiopentaerythritoldiphosphite, dilauryldithiopentaerythritoldiphosphite, phenyllauryldithiopentaerythritoldiphosphite and mixtures of two or more of the foregoing.

The blending proportion of the thiophosphite is in the range of 0.05 to 5% by weight, preferably 0.1 to 2% by weight. If the proportion is less than 0.05% by weight, the drip-preventing effect is poor, while even if it exceeds 5% by weight, there is no improvement in the drip-preventing effect, and hence such excess is meaningless.

Examples of the polyolefin resin used in the present invention are crystalline propylene homopolymer, crystalline copolymers of propylene as main component with one kind or more selected from ethylene, butene-1, pentene-1, hexene-1, 4-methylpentene-1, heptene-1, octene-1 and decene-1, low density polyethylene, medium density polyethylene, high density polyethylene, ethylene-propylene rubber, ethylene-vinyl acetate copolymer, styrene-butadiene copolymer and mixtures of two kinds or more of the foregoing. Among these, propylene homopolymer and propylene-ethylene random copolymer and propylene-ethylene block copolymer, each composed mainly of propylene, are particularly preferred. Further, blends of such polymers with ethylene-propylene rubber, polyethylene, etc. may also be used.

The processing aid used in the present invention is 2-t-butyl-6-(3-t-butyl-2-hydroxy-5-methylbenzyl)-4-methylphenyl acrylate, and its blending proportion is in the range of 0.02 to 1 part by weight, preferably 0.1 to 1 part by weight based on 100 parts by weight of the resin composition obtained by blending with a polyolefin resin, specified quantities of a halogen-containing flame retardant, antimony trioxide, a crosslinking agent and a thiophosphite selected from the compounds expressed by the formulas [I], [II], [III] and [IV].

If the quantity of the processing aid blended is less than 0.02 part by weight, the processability-improving effect is poor, while it does not matter if the quantity exceeds 1 part by weight, but the processability-improving effect has been satisfied and the cost increases and hence such excess is uneconomical.

In the composition of the present invention, additives usually added to polyolefin resins may be used together therewith such as antioxidant, antistatic agent, lubricant, pigment, inorganic filler (e.g. calcium carbonate, talc, clay, mica, magnesium hydroxide, aluminum hydroxide, glass fibers, various kinds of metal powder, metal fiber, borax, borofluorides, etc.), etc.

The preparation of the composition of the present invention has no particular limitation, but definite quantities of the above components (A), (B), (C), (D) and (E) or (A), (B), (C), (D), (E) and the processing aid are placed in mixer such as Henschel mixer (tradename), super mixer or the like, followed by mixing these materials with stirring and melt-kneading by rolls, extruder or the like means and pelletizing to obtain the composition. The melt-kneading temperature is in the range of 170° to 250° C., preferably 180°-230° C.

The molded product obtained by molding the composition of the present invention has highly flame retardant properties; causes no drip at the time of its combustion; are superior in heavy metal deterioration resistance, heat deterioration resistance and weather resistance; and has a smooth surface, a superior appearance and a good prooessability.

Whereas, in the case of compositions obtained by blending with a polyolefin resin, a halogen-containing flame retardant, antimony trioxide, a crosslinking agent and an organic peroxide, the organic peroxide is decomposed by melt-kneading at the time of granulation to generate radicals and cause crosslinking reaction. As a result, the resulting pellets contain a crosslinked product; hence when such pellets are molded into a desired molded product, such a molded product has a roughened surface to notably reduce its commodity value, or when they are molded into a desired molded product, crosslinking reaction proceeds and the resulting molded product has a roughened surface to reduce its commodity value; the drip-preventing effect is also insufficient; and the heavy metal deterioration resistance, heat deterioration resistance and weather resistance notably lower as compared with the case where the composition of the present invention is used.

The molded product obtained from the composition of the present invention has no dripping properties and has a smooth surface and a superior appearance. This is considered to be due to a fact that the thiophosphite used in the present invention does not generate any radical by decomposition at a temperature of 250° C. or lower, unlike general organic peroxides, and hence there occurs no crosslinking reaction during the melt-kneading at the time of granulation and molding-processing; thus the resulting molded product has a superior appearance, while it is decomposed at higher temperatures as in the case of the time of combustion to generate radicals and thereby promote crosslinking reaction; hence it has a function of preventing drip of combustion pieces.

The present invention will be described in more detail by way of Examples and Comparative examples. In addition, the evaluation methods therein were carried out according to the following:

(1) Burning test

Same test pieces of 127 mm long, 12.7 mm wide and 0.8 mm thick were prepared according to injection molding method, and each five of the test pieces as one set were subjected to burning test. The test pieces were fixed at the upper ends thereof and vertically hung in a chamber wherein air was still. Using a commercial methane gas having a heating value of 37 MJ/m$^3$ as a gas for combustion, a flame from a Bunsen burner having an inner diameter of 9.5 mm adjusted so as to occasion a blue flame of 19 mm long was applied to the test pieces at the lower ends thereof for 10 seconds.

After 10 seconds, the burner was removed, followed by measuring the period of time during which the test pieces were flaming. The periods of time were recorded as a first combustion time in Table 1. Just after flame-out of the test pieces, the blue flame of the burner was applied again to the test pieces at the lower ends thereof in the same manner as above, for 10 seconds to measure the period of time from the combustion till the flame-out of the test pieces. The periods of times were recorded as a second combustion time. Further the period of time during which the pieces were successively glowing, was also measured and recorded as glowing time. Cotton was placed 305 mm below the test pieces, and it was observed and recorded whether there was a drip during the burning test and also whether the cotton ignited by the drip.

The above burning test was carried out with 5 test pieces each one test. The maximum time among the first combustion times and the second ones in the burning test with the 5 test pieces was recorded as the maximum combustion time, and the total time of the first combustion time and the second one with the 5 test pieces was recorded as the total combustion time. Further, the maximum time among the glowing times in the burning test with the 5 test pieces was recorded as the maximum glowing time.

From the results of the above burning test, the flame retardant properties were judged, evaluated and classified according to the following standards:

A: Case where the following 5 standards are satisfied:
(i) The maximum combustion time is 10 seconds or less.
(ii) The total combustion time is 50 seconds or less.
(iii) The test piece does not continue to burn up to its tip end where the piece is fixed.
(iv) There is no drip.
(v) The maximum glowing time is 30 seconds or less.

B: Case where the following 5 standards are satisfied:
(i) The maximum combustion time is 30 seconds or less.
(ii) The total combustion time is 250 seconds or less.
(iii) The test piece does not continue to burn up to its tip end where the piece is fixed.
(iv) Even when there are some drips, cotton placed 305 mm below the lower end of the piece is not burnt thereby.
(v) The maximum glowing time is 60 seconds or less.

C: Case where both the standards A and B are not satisfied or both the standards cannot be judged to be satisfied:

(2) Heat deterioration resistance:

A test piece of 50 mm long, 25 mm wide and 1 mm thick was prepared according to injection molding method, and tested at 160° C. according to JIS K7212.

It was judged whether the heat deterioration resistance was good or not, from the number of days which lapsed by the date on which occurrence of cracks or fractures in the test piece was observed by naked eyes.

(3) Heavy metal deterioration resistance (copper deterioration resistance):

A test piece of 50 mm long, 25 mm wide and 1 mm thick was prepared according to injection molding method, and a copper sheet of 30 mm long, 20 mm wide and 0.3 mm thick having the surface sufficiently polished was adhered and fixed onto the test piece, followed by placing the resulting material in an oven at 150° C., to judge whether the heavy metal deterioration resistance is superior or inferior, from the number of days which lapsed by the date of occurrence of cracks or fractures in the test piece.

(4) Melt flow rate
according to JIS K7210:

(5) Izod impact strength:
according to JIS K7110.

(6) Appearance:

The presence or absence of roughened surface, melt fracture and spot on the surface of the molded product was observed by naked eyes and evaluated.

EXAMPLES 1-3 AND COMPARATIVE EXAMPLES 1-5

EXAMPLES 1-3

An ethylene-propylene block copolymer having a melt flow rate (a quantity of molten resin extruded at 230° C. under a load of 2.16 Kg over 10 minutes) of 10 and if necessary, an ethylene-propylene rubber or magnesium hydroxide, decabromodiphenyl ether as a halogen-containing flame retardant, antimony trioxide, trimethylolpropane triacrylate as a crosslinking agent and trilauryltrithiophosphite as a thiophosphite were mixed so as to give a blending composition described later in Table 1, followed by adding to the resulting blend (100 parts by weight), 2,6-di-t-butyl-p-cresol (0.15 part by weight) and Irganox 1010 (tradename of product made by CIBA-GEIGY, Limited) (0.05 part by weight) each as an antioxidant and calcium stearate (0.10 part by weight) as a neutralizing agent, and mixing these with stirring by means of a Henschel mixer (tradename) for 3 minutes.

The respective resulting blends were subjected to melt-knead-extruding by means of a twin-screw extruder having a bore diameter of 45 mm at a melt-kneading temperature of 200° C., and pelletized.

Comparative Examples 1-5

The respective blending components were mixed so as to give blending compositions described in Table 1, followed by adding an antioxidant and a neutralizing agent in the same manner as in Examples 1-3, and blending these with stirring, melt-knead-extruding and pelletizing in the same manner as in Examples 1-3.

The pellets obtained in the above Examples and Comparative examples were respectively dried at 100° C. for 3 hours, followed by subjecting the resulting pellets to injection molding at a resin temperature of 250° C. by means of an injection molding machine, into definite test pieces, which were then subjected to burning test, Izod impact test and tests of heavy metal deterioration resistance, heat deterioration resistance and weather resistance. Further, the melt flow rate of the resulting pellets was measured and the surface appearance of the resulting test pieces was observed by naked eyes and evaluated. The results are collectively shown in Table 1.

pieces was observed and evaluated by naked eyes. These results are collectively shown in Table 1.

TABLE 1

|  | Unit | Ex. 1 | Ex. 2 | Ex. 3 | Comp. ex. 1 | Comp. ex. 2 | Comp. ex. 3 | Comp. ex. 4 | Comp. ex. 5 | Ex. 4 | Comp. ex. 6 |
|---|---|---|---|---|---|---|---|---|---|---|---|
| Blending composition | | | | | | | | | | | |
| Polyolefin resin 1 | wt. % | 57.5 | 62.5 | 62.5 | 57.99 | 57.95 | 58 | 60.5 | 55 | — | — |
| Polyolefin resin 2 | " | — | — | — | — | — | — | — | — | 57.5 | 61 |
| Ethylene-propylene rubber | " | 5 | — | 5 | 5 | 5 | 5 | 5 | 5 | 5 | 5 |
| Halogen-containing flame retardant | " | 22 | 22 | 22 | 22 | 22 | 22 | 22 | 25 | 22 | 22 |
| Antimony trioxide | " | 7 | 7 | 7 | 7 | 7 | 7 | 7 | 10 | 7 | 7 |
| Inorganic filler | " | 5 | 5 | — | 5 | 5 | 5 | 5 | 5 | 5 | 5 |
| Crosslinking agent | " | 3 | 3 | 3 | 3 | 3 | 3 | — | — | 3 | — |
| Thiophosphite | " | 0.5 | 0.5 | 0.5 | — | — | — | 0.5 | — | 0.5 | — |
| Organic peroxide | " | — | — | — | 0.01 | 0.05 | — | — | — | — | — |
| Melt flow rate | g/10 min. | 8.0 | 11.4 | 9.5 | 2.0 | 7.0 | 8.5 | 7.9 | 7.5 | 11.2 | 8.7 |
| Appearance | — | smmoth | smooth | smooth | spots | many spots | smooth | smooth | smooth | smooth | smooth |
| Izod impact strength | kgf/cm$^2$ | 15 | — | — | 15 | 12 | 15 | 7 | 8.5 | 3.6 | 3.3 |
| Max. combustion time | sec. | 0 | 3 | 6 | 5 | 1 | 3 | * | 10 | 0 | * |
| Total combustion time | sec. | 0 | 15 | 30 | 35 | 10 | 15 | * | 30 | 0 | * |
| Max. glowing time | sec. | 10 | 18 | 43 | 50 | 53 | * | * | * | 8 | * |
| Drip | — | none | none | none | yes | yes | yes | yes | yes | none | yes |
| Cotton ignition | — | none | none | none | none | none | yes | yes | none | none | yes |
| Classification of flame detardant properties | — | A | A | B | B | B | C | C | C | A | C |
| Heavy metal deterioration resistance | day | 26 | 25 | 26 | 1 | <1 | 1 | 16 | 2 | 27 | 1 |
| Heat deterioration resistance | day | 38 | 40 | 40 | 10 | 7 | 30 | 16 | 13 | 41 | 15 |

(Note)
Polyolefin resin 1: ethylene-propylene block copolymer (ethylene content: 12% by weight, melt flow rate: 10)
Polyolefin resin 2: propylene homopolymer (melt flow rate: 10)
Ethylene-propylene rubber: EPO2P (tradename of product made by Japan Synthetic Rubber Co., Ltd.)
Halogen-containing flame retardant: decabromodiphenyl oxide
Inorganic filler: magnesium hydroxide
Crosslinking agent: trimethylolpropane triacrylate
Thiophosphite: trilauryltrithiophosphite
Organic peroxide: 1,3-bis(t-butyl-peroxyiso-propyl)benzene
*: unmeasurable due to dropping of combustion pieces

1.

EXAMPLE 4 AND COMPARATIVE EXAMPLE 6

EXAMPLE 4

A propylene homopolymer having a melt flow rate of 10 was used as a polyolefin resin; various blending components were blended so as to give a blending composition described in Table 1; an antioxidant and a neutralizing agent were added as in Examples 1-3; and blending with stirring, melt-knead-extruding and pelletizing were carried out as in Examples 1-3.

Comparative Example 6

Various blending components were blended so as to give a blending composition described in Table 1; an antioxidant and a neutralizing agents were added as in Examples 1-3; and blending with stirring, melt-knead-extruding and pelletizing were carried out as in Examples 1-3.

The pellets obtained in Example 4 and Comparative example 6 were respectively dried at 100° C. for 3 hours, followed by subjecting them to injection molding at a resin temperature of 250° C. by means of an injection molding machine to prepare definite test pieces, which were then subjected to burning test, Izod impact test, and tests of heavy metal deterioration resistance, heat deterioration resistance and weather resistance.

Further, the melt flow rate of the resulting pellets was measured and the surface appearance of the test pieces was observed and evaluated by naked eyes. The results are collectively shown in Table 1.

EXAMPLE 5-7 AND COMPARATIVE EXAMPLES 7 AND 8

EXAMPLE 5-7

An ethylene-propylene block copolymer (ethylene content: 12% by weight, melt flow rate: 10) was used as a polyolefin resin; blending components were mixed so as to give blending compositions described in Table 2; an antioxidant and a neutralizing agent were then added as in Example 1-3; and blending with stirring, melt-knead-extruding and pelletizing were carried out as in Examples 1-3.

Comparative Examples 7 and 8

Blending components were mixed so as to give blending compositions described in Table 2; an antioxidant and a neutralizing agent were added as in Examples 1-3; and blending with stirring, melt-knead-extruding and pelletizing were carried out as in Examples 1-3.

The respective pellets obtained in Examples 5-7 and Comparative examples 7 and 8 were dried at 100° C. for 3 hours, followed by subjecting the pellets to injection molding at a resin temperature of 250° C. by means of an injection molding machine, into definite test pieces, and carrying out burning test, Izod impact test, heavy metal deteriration resistance test and heat deterioration resistance test. Further, the melt flow rate of the pellets was measured and the surface appearance of the test pieces was observed and evaluated by naked eyes. The results are collectively shown in Table 2.

TABLE 2

|  | Unit | Example 5 | Example 6 | Comparative ex. 7 | Example 7 | Comparative ex. 8 |
|---|---|---|---|---|---|---|
| Polyolefin resin 1 | wt. % | 47.5 | 47.5 | 47.5 | 55.5 | 55.5 |
| Ethylene-propylene rubber | " | 5 | 5 | 5 | 5 | 5 |
| Halogen-containing flame retardant | " | 22 | 22 | 22 | 22 | 22 |
| Antimony trioxide | " | 7 | 7 | 7 | 7 | 7 |
| Inorganic filler 1 | " | 5 | 5 | 5 | 5 | 5 |
| Inorganic filler 2 | " | 10 | 10 | 10 | — | — |
| Carbon black | " | — | — | — | 2 | 2 |
| Crosslinking agent | " | 3 | 3 | 3 | 3 | 3 |
| Thiophisphite | " | 0.5 | 0.5 | 0.5 | 0.5 | 0.5 |
| Processing aid | Part by weight | 0.3 | 0.6 | — | 0.1 | — |
| Melt flow rate | g/10 min. | 3.9 | 7.9 | 0.14 | 5.4 | 2.0 |
| Appearance | — | smooth | smooth | spots | smooth | smooth |
| Izod impact strength | kgf/cm$^2$ | 7.3 | 7.1 | 7.0 | 13.5 | 13 |
| Max. combustion time | sec. | 4 | 2 | 2 | 8 | 6 |
| Total combustion time | sec. | 5 | 5 | 7 | 20 | 25 |
| Max. glowing time | sec. | 0 | 0 | 0 | 28 | 32 |
| Drip | — | none | none | none | none | none |
| Cotton ignition | — | none | none | none | none | none |
| Classification of floame detardant properties | — | A | A | A | A | A |
| Heavy metal deterioration resistance | day | 26 | 25 | 1 | 27 | 2 |
| Heat deterioration resistance | day | 39 | 40 | 10 | 40 | 13 |

(Note)
Polyolefin resin 1: ethylene-propylene block copolymer (ethylene content: 12% by weight, melt flow rate: 10)
Ethylene-propylene rubber: EPO2P
Halogen-containing flame reatardant: decabromodiphenyl oxide
Inorganic filler 1: magnesium hydroxide
Inorganic filler 2: mica
Crosslinking agent: trimethylolpropane triacrylate
Thiophosphite: trilauryl trithiophosphite
Processing aid: 2-t-butyl-6-(3-t-butyl-2-hydroxy-5-methylbenzyl)-4-methylphenyl acrylate As apparent from Table 1, any of the molded products obtained in Examples 1–3 had a smooth surface appearance and also a sufficient Izod impact strength. Further, as to their flame retardant properties, too, any of the maximum combustion times were 10 seconds or less and any of the total combustion times were 30 seconds or less and also no drip occurred. Further, their heavy metal deterioration resistance and heat deterioration resistance were much superior. As to Comparative examples 1 and 2 wherein the thiophosphite among the blending composition of the present invention was replaced by an organic peroxide, the resulting molded products had a surface-roughened appearance and glistening spots, and in the case of Comparative example 2, such phenomena were more notable; hence in both the cases, their utility was far inferior. Further, drip was observed, and it was found that their heavy metal deterioration resistance and heat deterioration resistance, too, were far inferior to those in Examples 1–3.

In the case of Comparative example 4 using a composition deficient in the crosslinking agent used in the composition of the present invention, the Izod impact strength was lower, drip was observed; and heavy metal deterioration resistance and heat deterioration resistance were also inferior.

In the case of Comparative example 5 using a composition deficient in the crosslinking agent and thiophosphite used in the composition of the present invention, it was found that the Izod impact strength was lower; drip was observed; and heavy metal deterioration resistance and heat deterioration resistance were also inferior, as in the case of Comparative example 4; thus, practical problems were raised.

In the case of Example 4 wherein the same blending composition as in Example 1 was employed except that a propylene homopolymer having a melt flow rate of 10 was used as the polyolefin resin, it was found that the appearance was smooth; the flame retardant properties were superior; no drip was observed; and heavy metal deterioration resistance and heat deterioration resistance were also superior; thus the composition had a sufficient utility.

In the case of Comparative example 6 having a composition deficient in the crosslinking agent and thiophosphite used in the composition of the present invention, drip was observed and the heavy metal deterioration resistance and the heat deterioration resistance were also far inferior to those in the case of Example 4.

Further, as apparent from Table 2, in the case of Comparative example 7 wherein mica (10% by weight) was used together with magnesium hydroxide both as an inorganic filler, the resulting composition had an melt index extremely lowered down to 0.14 so that the processability became inferior; thus spots were observed on the surface of the molded product. Whereas in the case of Example 5 wherein 0.3 part by weight of a processing aid was blended beside the above two fillers, and also in the case of Example 6 wherein 0.6 part by weight of the processing aid was blended beside the above two fillers, the resulting compositions had melt flow rates as high as 3.9 and 7.9 respectively, so that their processability was superior and the resulting molded product had a smooth surface.

Further, in the case of Comparative example 8 wherein 2% by weight of carbon black was added as a coloring agent, the melt flow rate of the resulting composition lowered down to 2.0, whereas in the case of Example 7 wherein 0.1 part by weight of a processing aid was also blended, the composition had a melt flow rate of 5.4 and exhibited a superior processability.

As described above, the molded products using the composition of the present invention have highly flame retardant properties; cause no drip; have superior heavy metal deterioration resistance and heat deterioration resistance; have a smooth surface and a superior appearance; and also have a superior weather resistance.

What we claim is:

1. A flame retardant polyolefin resin composition consisting of
   (A) 5 to 60% by weight of a halogen-containing flame retardant,
   (B) 100 to 10% by weight of antimony trioxide based on the weight of said halogen-containing flame retardant,
   (C) 0.5 to 15% by weight of a crosslinking agent,
   (D) 0.05 to 5% by weight of a thiophosphite selected from those expressed by the following formulas [I], [II], [III] and [IV]:

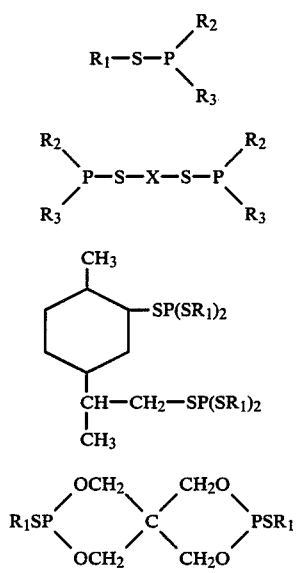

wherein $R_1$ represents an alkyl group, a cycloalkyl group or an aryl group each of 6 to 20 carbon atoms; $R_2$ represents $-SR_2'$ or $-R_2'$; $R_3$ represents $-SR_3'$ or $-R_3'$; $-R_2'$ and $-R_3'$ each represent the same or different alkyl groups, cycloalkyl groups or aryl groups each of 6 to 20 carbon atoms; X represents $-(CH_2)_n-$, $-(CH_2)_n-O-(CH_2)_m-$ or

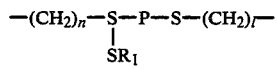

wherein m, n and l each represent an integer of the same or different numbers within a range of 2 to 6, and
   (E) the balance % by weight of a polyolefin resin the total of the quantities of (A), (B), (C), (D) and (E) being 100% by weight.

2. A flame retardant polyolefin resin composition according to claim 1 wherein said polyolefin resin is selected from crystalline propylene homopolymer, crystalline copolymers of propylene as main component with at least one member selected from the group consisting of ethylene, butene-1, pentene-1, hexene-1, 4-methylpentene-1, heptene-1, octene-1 and decene-1 or mixtures of the foregoing.

3. A flame retardant polyolefin resin composition according to claim 1 wherein said polyolefin resin is at least one member selected from the group consisting of low density polyethylene, medium density polyethylene, high density polyethylene, ethylene-propylene rubber, ethylene-vinyl acetate copolymer, styrene-butadiene copolymer and mixtures of two kinds or more of the foregoing.

4. A flame retardant polyolefin resin composition according to claim 1 wherein said flame retardant is at least one member selected from the group consisting of decabromodiphenyl oxide, hexabromobenzene, ethylenebistetrabromophthalimide and perchloropentacyclodecane.

5. A flame retardant polyolefin resin composition according to claim 1 wherein said thiophosphite is at least one member selected from the group consisting of trilauryltrithiophosphite, tridecyltrithiophosphite, tribenzyltrithiophosphite, tricyclohexyltrithiophosphite, tri(2-ethylhexyl)trithiophosphite, trinaphthyltrithiophosphite, diphenyldecyltrithiophosphite, diphenyllauryltrithiophosphite, tetralauryl-4-oxaheptylene-1,7-tetrathiophosphite, tetrakis(mercaptolauryl)-1,6-dimercaptohexylenediphosphite, pentakis(mercaptolauryl)-bis(1,6-hexylene-dimercapto)trithiophosphite, tetrakis(mercaptolauryl)-2,9-dimercapto-para-methylenediphosphile, bis(mercaptolauryl)-1,6-dimercaptohexylene-bis(benzenephosphite), tetrakis(mercaptolauryl)-2,9-dimercapto-para-methylenediphosphite, dioctyldithiopentaerythritoldiphosphite, dilauryldithiopentaerythritoldiphosphite, phenyllauryldithiopentaerythritoldiphosphite and mixtures of two or more of the foregoing.

6. A flame retardant polyolefin resin composition having 0.02 to 1 part by weight of 2-t-butyl-6-(3-t-butyl-2-hydroxy-5-methylbenzyl)-4-methylphenyl acrylate blended with 100 parts by weight of a resin composition consisting of
   (A) 5 to 60% by weight of a halogen-containing flame retardant,
   (B) 100 to 10% by weight of antimony trioxide based on the weight of said halogen-containing flame retardant,
   (C) 0.5 to 15% by weight of a crosslinking agent,
   (D) 0.05 to 5% by weight of a thiophosphite selected from those expressed by the following formulas [I], [II], [III] and [IV]:

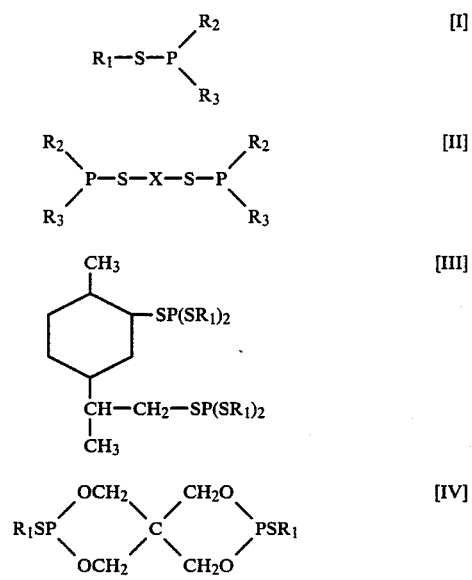

wherein $R_1$ represents an alkyl group, a cycloalkyl group or an aryl group each of 6 to 20 carbon atoms; $R_2$ represents —$SR_2'$ or —$R_2'$; $R_3$ represents —$SR_3'$ or —$R_3'$; —$R_2'$ and —$R_3'$ each represent the same or different alkyl groups, cycloalkyl groups or aryl groups each of 6 to 20 carbon atoms; X represents —$(CH_2)_n$—, —$(CH_2)_n$—O—$(CH_2)_m$— or

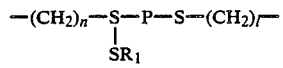

wherein m, n and l each represent an integer of the same or different numbers within a range of 2 to 6, and (E) the balance % by weight of a polyolefin resin the total of the quantities of (A), (B), (C), (D) and (E) being 100% by weight.

7. A flame retardant polyolefin resin composition according to claim 6 wherein said polyolefin resin is selected from crystalline propylene homopolymer, crystalline copolymers of propylene as main component with at least one member selected from the group consisting of ethylene, butene-1, pentene-1, hexene-1, 4-methylpentene-1, heptene-1, octene-1 and decene-1 or mixtures of the foregoing.

8. A flame retardant polyolefin resin composition according to claim 6 wherein said thiophosphite is at least one member selected from the group consisting of trilauryltrithiophosphite, tridecyltrithiophosphite, tribenzyltrithiophosphite, tricyclohexyltrithiophosphite, tri(2-ethylhexyl)trithiophosphite, trinaphthyltrithiophosphite, diphenyldecyltrithiophosphite, diphenyllauryltrithiophosphite, tetralauryl-4-oxaheptylene-1,7-tetrathiophosphite, tetrakis(mercaptolauryl)-1,6-dimercaptohexylenediphosphite, pentakis(mercaptolauryl)-bis(1,6-hexylene-dimercapto)trithiophosphite, tetrakis(mercaptolauryl)-2,9-dimercapto-para-methylenediphosphite, bis(mercaptolauryl)-1,6-dimercaptohexylene-bis(benzenephosphite), tetrakis(mercaptolauryl)-2,9-dimercapto-paramethylenediphosphite, dioctyldithiopentaerythritoldiphosphite, dilauryldithiopentaerythritoldiphosphite, phenyllauryldithiopentaerythritoldiphosphite and mixtures of two or more of the foregoing.

* * * * *